Mar. 6, 1923.
C. THERIOT
TRAP
Filed June 30, 1922
1,447,525
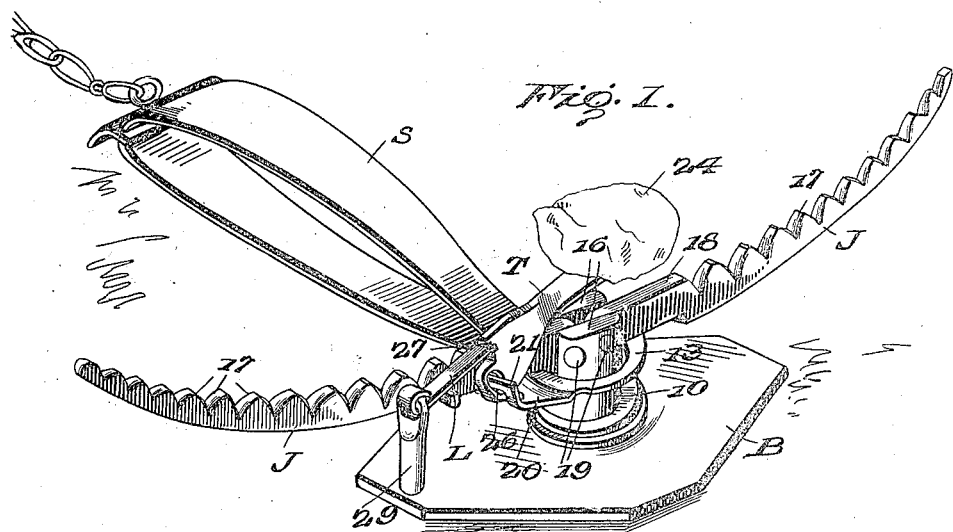
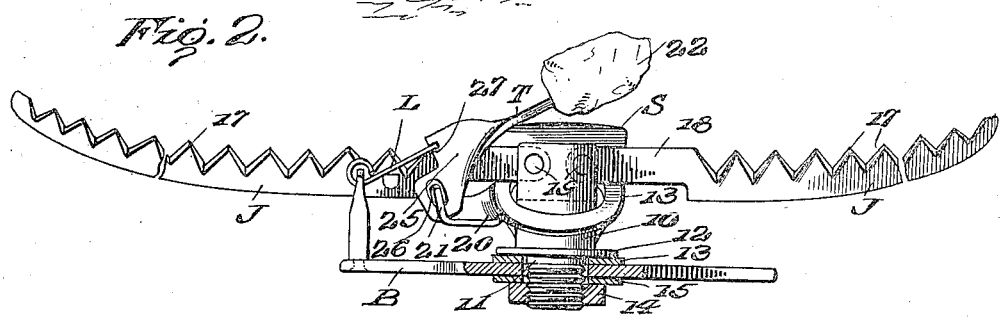
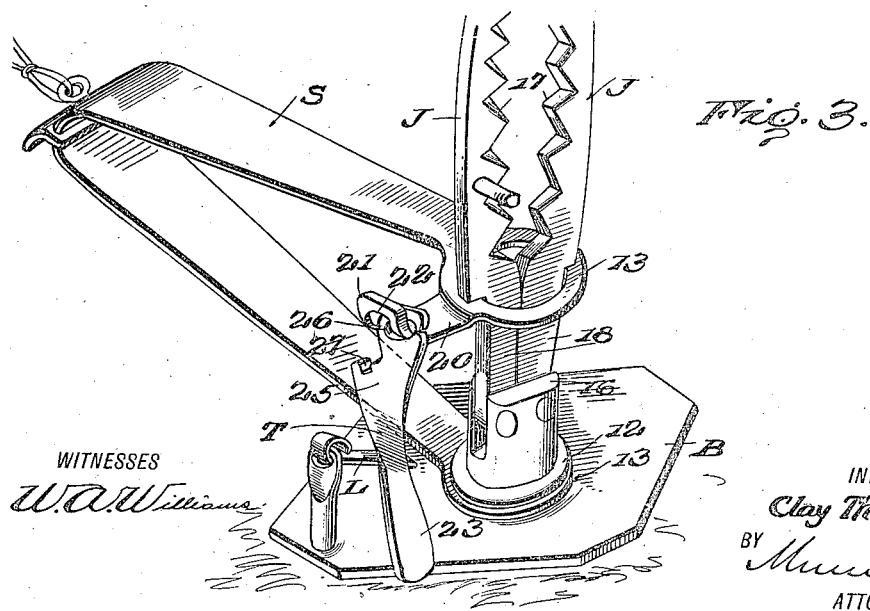
WITNESSES
W. A. Williams
INVENTOR
Clay Theriot
BY
Munn & Co.
ATTORNEYS Patented Mar. 6, 1923.

1,447,525

UNITED STATES PATENT OFFICE.

CLAY THERIOT, OF HOUMA, LOUISIANA.

TRAP.

Application filed June 30, 1922. Serial No. 571,944.

*To all whom it may concern:*

Be it known that I, CLAY THERIOT, a citizen of the United States, and a resident of Houma, in the parish of Terrebonne and State of Louisiana, have invented certain new and useful Improvements in Traps, of which the following is a specification.

This invention relates to an improvement in traps.

Traps commonly employed for catching muskrats, or other fur bearing animals, operate to engage the leg of the animal, and in many instances the fur upon the leg of the animal is ruined through the efforts of the animal to free himself. Also at times the animal severs his leg in order to extract the same from the trap.

With the above in view it is a prime object of the invention to provide a trap of the character referred to which is adapted when trapped by an animal to close about the body of the animal and thus to securely hold the same and also obviate the disadvantages above referred to.

Other objects relating to details of construction will hereinafter appear.

The invention is illustrated by way of example in the accompanying drawings, in which:—

Figure 1 is a perspective view of a trap embodying the present invention and showing the same when set.

Figure 2 is a view in end elevation of the same and partly shown in section in order to more clearly illustrate the detailed construction thereof.

Figure 3 is a partial perspective view showing the trap after the same has been sprung.

Referring to the drawings more particularly, S indicates generally a bow-spring of the type commonly employed in a trap of this type, J indicates a pair of jaws, B a base plate, T a trigger and L the latch for said trigger.

The base B is preferably made of metal, and centrally of said base there is positioned a post or stud 10, said stud having a lower and reduced end threaded portion 11 which is extended through a suitable opening centrally of the base plate B. Between the shoulder afforded by the reduced portion 11 and the upper surface of the base plate B there may be interposed a washer 12. The spring S may consist in a bow of spring material, such as highly tempered steel, and having each of its ends formed with an eye 13. The eye 13, in each instance, is adapted to loosely accommodate the stud or post 10, and the eye of the lowermost end of the spring S is interposed between the washer 12 and base plate B, as shown in the drawings. The lower end of the reduced portion 11 of stud 10 carries a nut 14, and between this nut and the base plate there may be interposed a washer 15. As is obvious by tightening the nut 14, the stud 10 may be rigidly held in position, and also the one end of the spring S clamped to the base B.

The upper end of the stud or post 10 is bifurcated to provide the two projections 16 between which there is pivotally connected the inner ends of the jaws J. Each jaw may consist in an arcuate-shaped member having its one edge serrated to provide the blunt-like teeth 17 and having an inner end portion 18 which is substantially square in cross section, and which is provided with a suitable opening whereby the same may be pivotally connected between the projections 16 of the stud 10 by the means of a pin or the like as indicated at 19.

The uppermost eye 13 of the spring S should occur below the jaws J, that is, should be disposed about the post 10 at this point and therefore the tendency of this spring would be to close the jaws J, as illustrated in Figure 3.

The uppermost eye 13 of the spring S has formed therewith a tang 20 extending radially therefrom and having its outer end formed with an upwardly bent portion 21 which is provided with an opening 22. The trigger T may consist in a strip of metal, its end portion 23 being adapted to serve for supporting a bait 24, Figures 1 and 2. The other end portion 25 of the trigger is bent so that its faces are disposed at substantially right angles to the faces of the portion 23 and also this end portion is slightly enlarged and provided with an eye as at 26 whereby the trigger may be pivotally connected to the end portion 21 of the tang 20 in an obvious manner. The inner end of the portion 25 of the trigger T may be provided with a notch 27 in which the latch L may engage. The latch L consists in a strip of metal and its rear end extended through an eye in a post 29 carried by the plate B and bent upon itself whereby to limit its upward movement to the position shown in Figures 1 and 2.

It should be noted that the tang 20 occurs immediately forward to the associated jaw J and by this arrangement the bait 24 may be disposed immediately forward to the pivotal point of the jaws J when the trap is set as illustrated in Figures 1 and 2 of the drawings. The trap is set in an obvious and apparent manner, that is, the spring S is depressed so that the jaws may assume their open position and then the latch is engaged with the trigger T in the manner shown. Now in case an animal approaches the trap and attempts to take the bait, he will of course be inclined to come upon the base plate B and stand in a position so that when the trap is swung, the jaws J will close about the body of the animal. It is important that the bait 24 be positioned as shown in order to accomplish these results. The trap when sprung appears as shown in Figure 3, and as is seen the jaws J would tightly clasp therein the animal trapped. Any suitable means may be connected with the spring S, that is, a chain or the like for securing the trap to an anchor.

I claim:

1. A trap, comprising a bait having bifurcated studs extending upwardly therefrom, a pair of jaws each having its one end pivotally connected to the bifurcated stud and adapted to swing upon said pivot for being brought to a closed position, a bow-spring having its one end secured to the base and its other end encircling the stud and disposed beneath the pivoted end of the jaws whereby to urge the same toward their closed position, a trigger carried by the end of spring associated with the jaws, and a latch carried by said base adapted for engaging said trigger and holding the associated end of spring in a depressed position.

2. A trap, comprising a bait having bifurcated studs extending upwardly therefrom, a pair of jaws each having its one end pivotally connected to the bifurcated stud and adapted to swing upon said pivot for being brought to a closed position, a bow-spring having its one end secured to the base and its other end encircling the stud and disposed beneath the pivoted end of the jaws whereby to urge the same toward their closed position, a trigger having its one end pivotally supported by the end of spring associated with the jaws, and a latch carried by the base adapted to engage the trigger whereby the free end of said trigger may be disposed immediately forward to the pivotal point of said jaws, said free end of the trigger being adapted to receive a bait.

3. A trap, comprising a bait having bifurcated studs extending upwardly therefrom, a pair of jaws each having its one end pivotally connected to the bifurcated stud and adapted to swing upon said pivot for being brought to a closed position, a bow-spring having its one end secured to the base and its other end encircling the stud and disposed beneath the pivoted end of the jaws whereby to urge the same toward their closed position, a tank extending from the end of spring associated with said jaws, a trigger having its one end pivotally connected to said tang, and a latch carried by said base and adapted to engage the trigger whereby the free end of said trigger may be disposed immediately forward to the pivotal point of said jaws.

4. An animal trap comprising a base, a pair of jaws each having its one end pivotally connected to said base and adapted for swinging movement toward each other, a bow-spring having its one end secured to the base and its other end positioned beneath the pivoted end of said jaws and adapted for urging the same toward each other, and means carried by the free end of the spring and base for holding the spring in a depressed position, said means being adapted to also serve as a bait holder and adapted to operate to release the spring for closing the jaws when an animal attempts to take the bait.

CLAY THERIOT.